(12) United States Patent
Morimoto et al.

(10) Patent No.: US 6,468,610 B1
(45) Date of Patent: Oct. 22, 2002

(54) GLASS PANEL AND METHOD OF FORMING THE SAME

(75) Inventors: Naoki Morimoto, Sagamihara (JP); Masakiyo Tonoike, Nagaokakyo (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/463,767

(22) PCT Filed: Jul. 9, 1999

(86) PCT No.: PCT/JP99/03756

§ 371 (c)(1),
(2), (4) Date: Jan. 31, 2000

(87) PCT Pub. No.: WO00/04268

PCT Pub. Date: Jan. 27, 2000

(30) Foreign Application Priority Data

Jul. 14, 1998 (JP) ............................................. 10-198686

(51) Int. Cl.[7] ............................. E06B 3/24; C03C 27/00
(52) U.S. Cl. ........................ 428/34; 156/109; 52/786.13
(58) Field of Search ........................... 428/34, 120, 192; 52/786.13; 156/107, 109

(56) References Cited

U.S. PATENT DOCUMENTS 5,657,607 A * 8/1997 Collins et al. ................. 428/34

FOREIGN PATENT DOCUMENTS

FR 2752012 * 2/1998
JP 102161 1/1998

* cited by examiner

Primary Examiner—Donald J. Loney
(74) Attorney, Agent, or Firm—Fulbright & Jaworski L.L.P.

(57) ABSTRACT

A glass panel and a manufacturing method thereof including numerous spacers (2) interposed between a pair of plate glasses (1A, 1B), an outer peripheral closing portion (4) provided between outer peripheries of the pair of plate glasses, and a sucking portion (3) provided in one plate glass (1A) of the pair of plate glasses for vacuum-closing a void portion (V) between the pair of plate glasses, wherein, in constructing the sucking portion (3), a sucking mouth (1a) is provided in one plate glass, a closing plate (6) is disposed to cover the sucking mouth and to lie along a plane of the one plate glass, and the one plate glass is integrated with the closing plate (6) by a bonding portion (7).

10 Claims, 9 Drawing Sheets

GLASS PANEL AND METHOD OF FORMING THE SAME

TECHNICAL FIELD

The present invention relates to a glass panel with an improved heat-insulating property as compared with ordinary plate glass, and a manufacturing method thereof. More particularly, the present invention relates to a glass panel including numerous spacers interposed between a pair of plate glasses, an outer peripheral closing portion provided between outer peripheries of the pair of plate glasses, and a sucking portion provided in one plate glass of the pair of plate glasses for vacuum-closing a void portion between the two plate glasses, and to a method of manufacturing a glass panel in which the glass panel is formed by sealing the sucking the portion after sucking gas in the void portion through the sucking portion.

BACKGROUND ART

Figure 23:
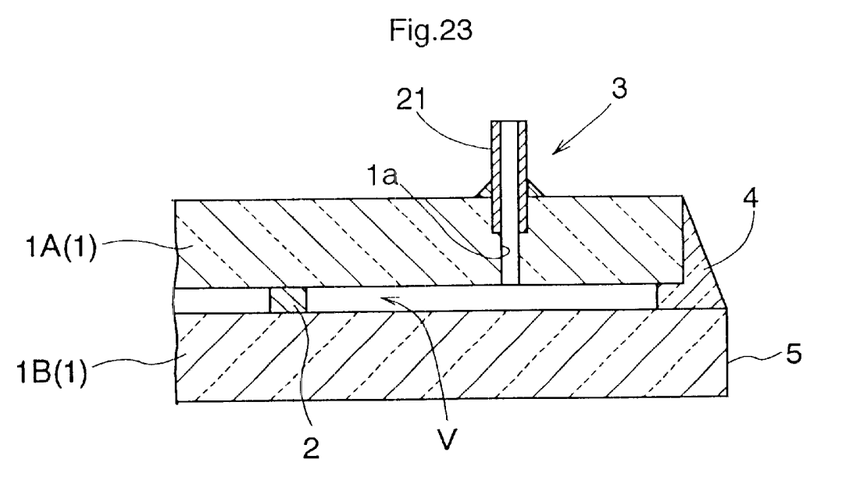
FIG. 23 and FIG. 24 are cross-sectional views showing a conventional glass panel.
Figure 24:
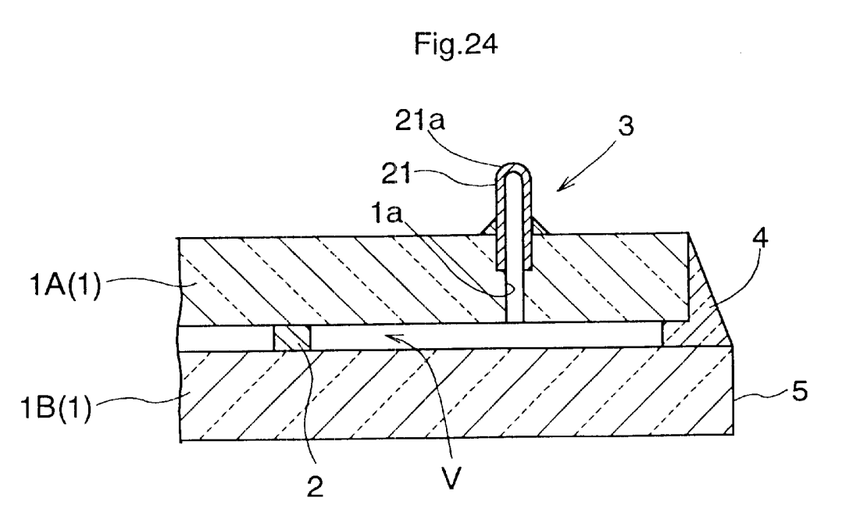

Conventionally, as this kind of a glass panel, there is known a glass panel in which a sucking portion 3 is constructed by fixing a glass tube 21 to a sucking mouth 1a formed in one plate glass 1A for communication, and a protruding tip end 21a of the glass tube 21 is formed to be capable of being closed by heat melting, as shown in FIG. 23 and FIG. 24.

Further, in a method for forming this kind of a glass panel, a glass tube 21 is fixed to the sucking mouth 1a for communication as shown in FIG. 23; the void portion V is vacuumized by suction through the glass tube 21; and the protruding tip end 21a is melted by heating to close an opening of the end of the glass tube, as shown in FIG. 24.

However, according to the above-mentioned conventional glass panel and method for forming a glass panel, the glass tube 21 remains in a protruding state on a surface of the plate glass 1A in the sucking portion 3, whereby appearance tends to be deteriorated. Also, there is a problem that other objects are likely to collide with the glass tube 21 and destruction of the sucking portion 3 caused by strong external force exerted on the glass tube 21 deteriorates the vacuum state of the void portion V to decrease the heat-insulating property as a glass panel.

Further, use of a cap for protection of the protruding portion of the glass tube 21 further deteriorates the appearance more.

Therefore, the purpose of the present invention is to provide a glass panel and a method for manufacturing the same in which the above-mentioned problems are solved, and the collision and the like of other objects against the sucking portion is avoided, with reduced deterioration of the appearance.

DISCLOSURE OF THE INVENTION

The characteristic constructions of the glass panel and the method for manufacturing the same are as follows.

A glass panel according to claim 1 is a glass panel including numerous spacers interposed between a pair of plate glasses, an outer peripheral closing portion provided between outer peripheries of the two plate glasses, and a sucking portion provided in one plate glass of the pair of plate glasses for vacuum-closing a void portion between the two plate glasses, as exemplified in FIG. 2 and FIG. 16 to FIG. 20.

Particularly, in constructing the sucking portion, a sucking mouth is provided in the one plate glass, and a closing plate is disposed to lie along a plane of the one plate glass for covering the sucking mouth. The plate glass and the closing plate are integrated by a bonding portion disposed between the plate glass and the closing plate.

According to this construction, the closing plate can seal the sucking portion with an extremely small amount of protrusion on the surface of the one plate glass. Therefore, it is easier to prevent breakage of the sucking portion caused by another object abutting to or being caught by the sucking portion, as compared with the conventional one.

As a result, the facility in handling the glass panel is improved, and the heat insulating property can be maintained more easily. Further, since the amount of protrusion from the surface of the plate glass is small, the sucking portion is less likely to be conspicuous and the deterioration of the appearance as a glass panel can be prevented more easily.

Figure 2:
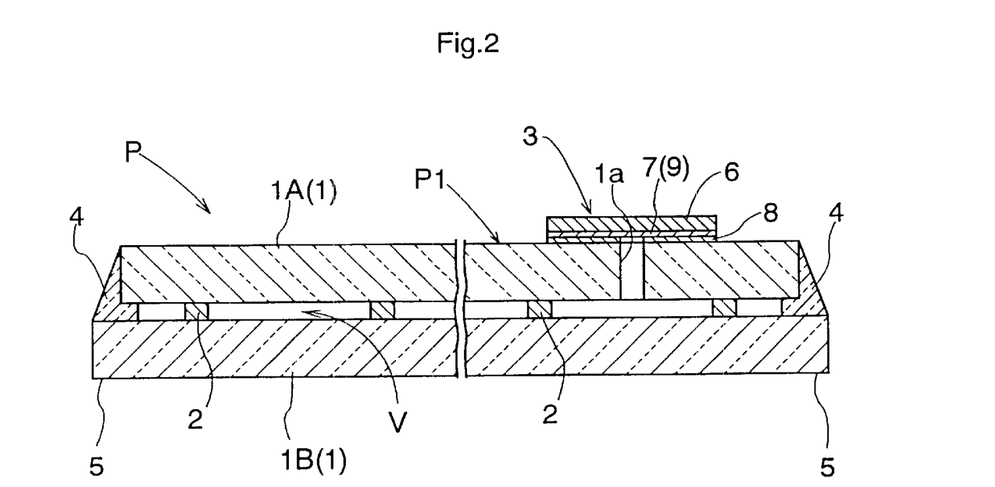
FIG. 2 is a cross-sectional view showing a glass panel.

In the invention according to claim 2, the bonding portion can be constructed with a bonding member having a melting point within a temperature range lower than a softening point of the plate glass and higher than an ambient temperature of use of the plate glass; and the closing plate can be constructed with a closing member having a melting point higher than the bonding portion, as shown in FIG. 2.

This construction produces the following effect in addition to the function and effect produced by the invention of claim 1.

Namely, the closing member and the one plate glass can be bonded with each other integrally and in close contact by solidification of the bonding member by raising the ambient temperature of the sucking portion with the bonding member and the closing member superposed on the sucking portion for melting the bonding member and then lowering the ambient temperature.

Accordingly, the bonding step can be carried out simply by controlling the temperature of the sucking portion either in an environment of atmospheric pressure or in an environment of reduced pressure, whereby the selectivity of the working environment can be improved, and it can be adapted to various glass panel manufacturing methods carried out under various environments.

Figure 16:
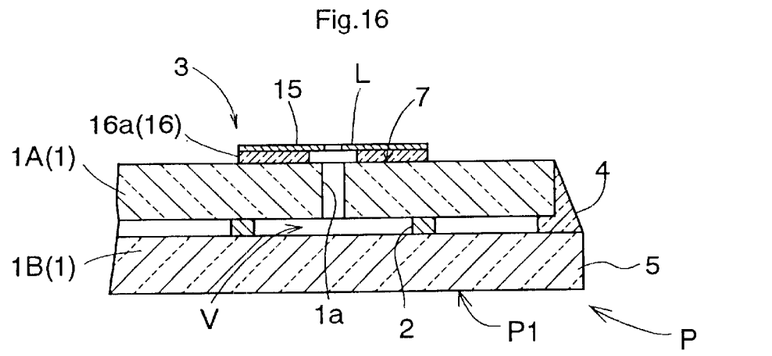
FIG. 16 and FIG. 17 are cross-sectional views showing sucking portion of another embodiment.
Figure 17:
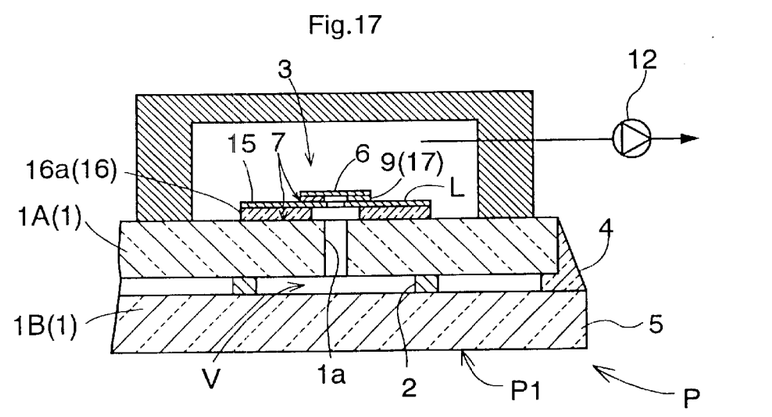

In a glass panel according to claim 3, a ring-shaped metal plate can be interposed between the plate glass and the closing plate; and the bonding portion can be constructed with a low melting point glass sintered layer integrally interposed between a surface of the plate glass on an edge of the sucking mouth and the ring-shaped metal plate, and with a solder layer integrally interposed between the ring-shaped metal plate and the closing plate, as shown in FIG. 16 and FIG. 17.

This construction produces the following effect in addition to the function and effect produced by the invention of claim 1.

For example, it is possible to adopt a method of sealing the sucking portion in which the bonding portion made of a low melting point glass sintered layer is formed under an environment of atmospheric pressure, and the bonding portion made of the solder layer is formed under an environment of reduced pressure.

Incidentally, the low melting point glass sintered layer is formed by sintering a low melting point glass and, if the temperature is raised under an environment of reduced pressure, there is a problem that a gas is generated from the low melting point glass to deteriorate the efficiency of hermetic closing between the two plate glasses. However, in the case of the glass panel of this construction, the bonding portion made of the low melting point glass sintered layer can be formed under an environment of atmospheric pressure, so that the low melting point glass can be used without hindrance. As a result of this, another object can be bonded to the glass in a more stable state.

Further, after the ring-shaped metal plate is bonded to the plate glass by the low melting point glass sintered layer, the bonding portion made of the solder layer can bond the closing plate further more strongly under an environment of reduced pressure with no generation of gas from the low melting point glass sintered layer. As a result of this, the sucking portion can be sealed without adopting a sophisticated method.

Here, the ring shape as referred to in the shape of the metal plate is not limited to a circular ring shape, but may be a polygonal ring shape or a ring shape with non-specified shape. These shapes as a whole are referred to as a ring shape.

Figure 18:
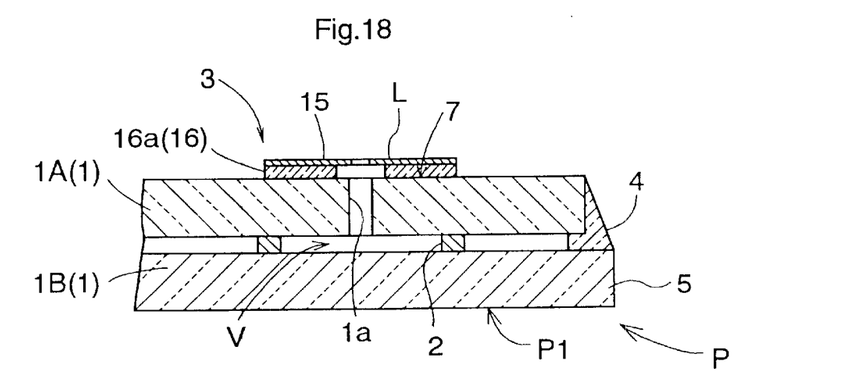
FIG. 18 to FIG. 20 are cross-sectional views showing sucking portion of another embodiment.
Figure 19:
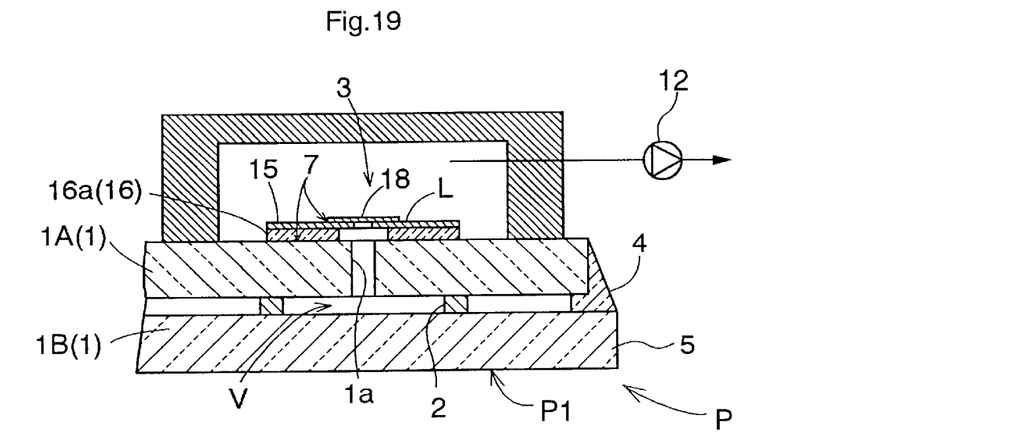
Figure 20:
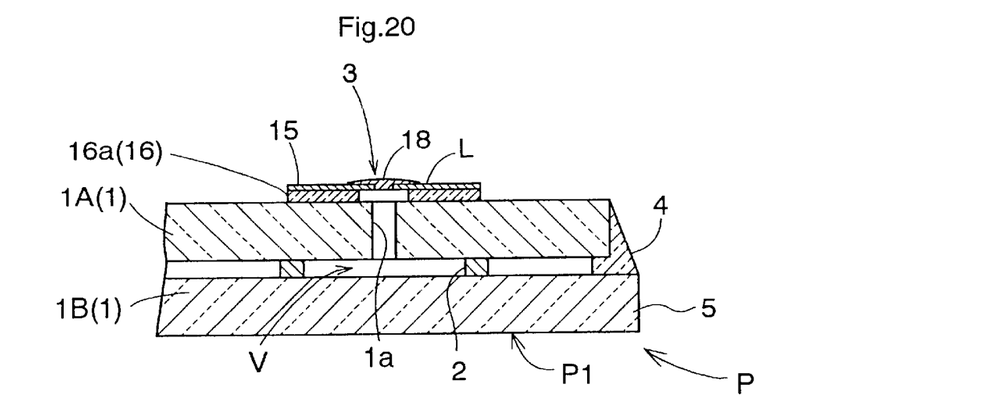

In a glass panel according to claim 4, the closing plate can be constructed with a second solder plate; a ring-shaped metal plate can be interposed between the plate glass and the closing plate; and the bonding portion can be constructed with a low melting point glass sintered layer integrally interposed between a surface of the plate glass on an edge of the sucking mouth and the ring-shaped metal plate, as shown in FIG. 18 to FIG. 20.

This construction produces the following effect in addition to the function and effect produced by the invention of claim 1.

According to this construction, for example, after the ring-shaped metal plate is bonded to the plate glass by the bonding portion made of a low melting point glass sintered layer under an environment of atmospheric pressure, the second solder plate can be mounted on the ring-shaped metal plate and the temperature can be raised under an environment of reduced pressure to melt the second solder plate for integration with the ring-shaped metal plate, thereby to seal the sucking portion.

In other words, as in the previously mentioned case, the low melting point glass sintered layer can be formed while avoiding the inconvenience of poor efficiency of closing between the two plates caused by generation of gas, so that another object can be bonded to the glass plate in a more stable state. Further, after the ring-shaped metal plate is bonded to the plate glass by the low melting point glass sintered layer, the temperature of the closing plate made of the second solder plate can be raised under a reduced pressure to close the sucking portion together with the ring-shaped metal plate, thereby facilitating the sealing of the sucking portion.

In a glass panel according to claim 5, a precious metal layer can be provided on a surface of the ring-shaped metal plate that faces the closing plate, as shown in FIG. 16 and FIG. 18.

If a precious metal layer is disposed on a surface of the ring-shaped metal plate on the closing plate side, the adhesion strength of the closing plate to be adhered to the surface can be increased, so that the degree of vacuum in the void portion can be maintained for a long period of time.

A glass panel according to claim 6 is directed to a method of manufacturing a glass panel using a glass panel body including numerous spacers interposed between a pair of plate glasses, an outer peripheral closing portion provided between outer peripheries of the two plate glasses; and a sucking portion provided in one plate glass of the pair of plate glasses for vacuum-closing a void portion between the two plate glasses, the glass panel being formed by sealing the sucking portion after sucking gas in the void portion through the sucking portion, characterized in that a surface of an edge portion of a sucking mouth of the one plate glass is metallized in a ring shape in advance; and a solder plate and a closing plate made of a metal are placed in superposition on the metallized portion and heated to melt the solder plate for integrating the plate glass with the closing plate, as shown in FIG. 3 to FIG. 13.

According to this means, since the solder plate is melted on the previously metallized portion, the sturdy closing plate made of metal can be integrated with the plate glass in a close bonded state. Therefore, the reliability of the sucking portion is improved, and the reduced pressure environment in the void portion can be maintained for a long period of time, thereby achieving a glass panel having a high heat-insulating property.

Further, the sucking portion can be sealed in a state of extremely small protrusion from the surface of the plate glass, thereby effectively preventing the generation of inconvenience such as breakage of the sucking portion caused by another object abutting against the sucking portion as well as improving the facility in handling.

Here, the metallizing refers, for example, to forming a layer on a surface of the plate glass by sintering of a silver paste, exerting a supersonic vibration on a solder (direct soldering method), plating, flame spraying, or the like. The metal to be used may be copper or nickel besides silver.

Figure 12:
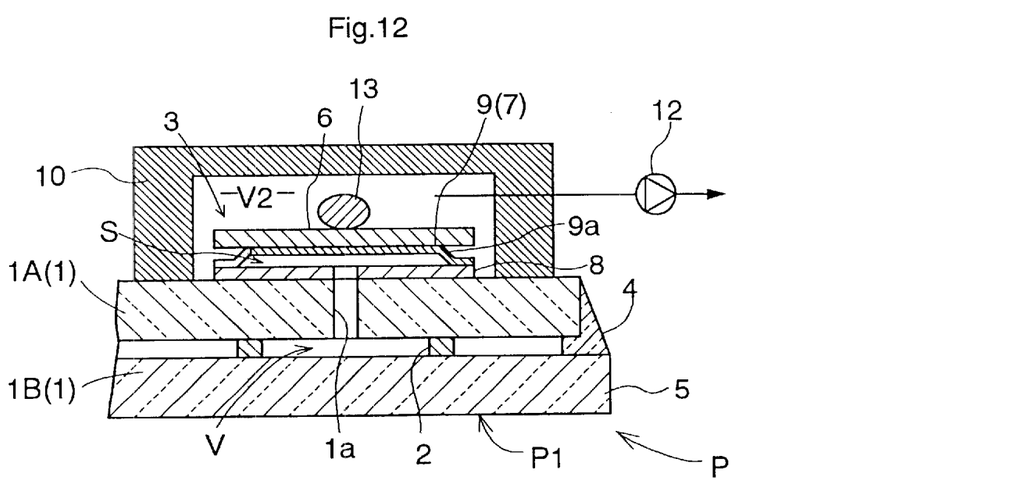
FIG. 12 and FIG. 13 are explanatory cross-sectional views showing another embodiment of a method of manufacturing a glass panel.
Figure 13:
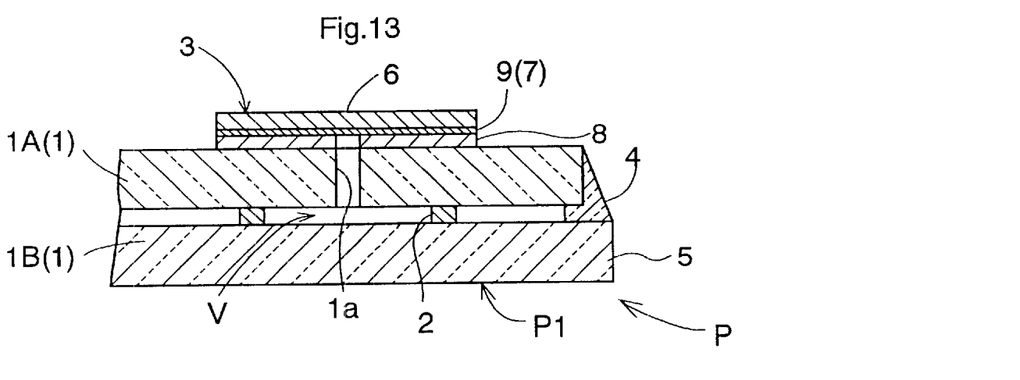
Figure 14:
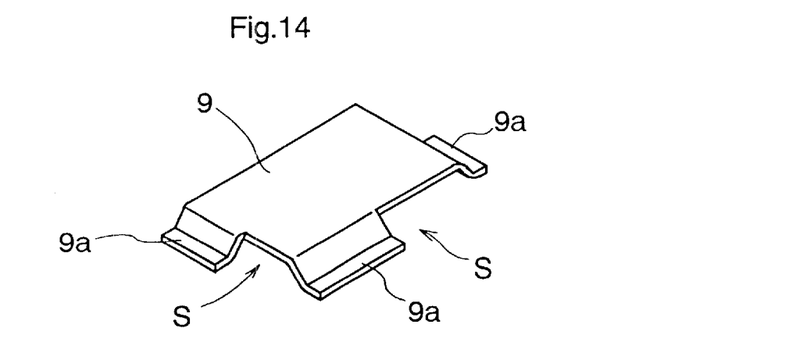
FIG. 14 is a cross-sectional view showing another embodiment of a bonding portion.

A glass panel according to claim 7 can be constructed using a solder plate that provides a gap between the solder plate and the metallized portion for enabling communication between the void portion and an external space, as shown in FIG. 12 to FIG. 14.

This construction produces the following effect in addition to the function and effect produced by the invention of claim 6.

Namely, the gas can be discharged smoothly and effectively through the gap in vacuumizing the void portion by sucking with the solder plate and the closing plate superposed on the sucking mouth.

Also, it facilitates prevention of displacement of the solder plate or the closing plate from the sucking mouth which displacement is caused by the gas sucked from the void portion to the external space, whereby the sucking portion can be sealed with good precision.

BEST MODES FOR CARRYING OUT OF THE INVENTION

Figure 1:
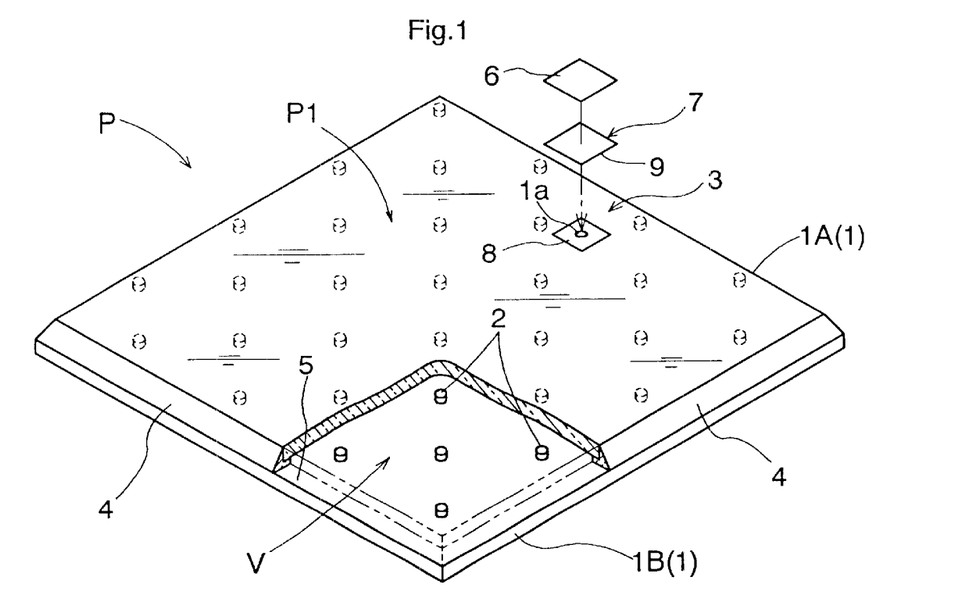
FIG. 1 is a partially cut-out perspective view showing a glass panel.

FIG. 1 and FIG. 2 show one embodiment of a glass panel according to the present invention. The glass panel P is mainly constructed with a glass panel body P1. The glass panel body P1 includes numerous spacers 2 interposed between a pair of plate glasses 1 at intervals along the plate surface, an outer peripheral closing portion 4 disposed between outer peripheries of the two plate glasses 1A, 1B, and a sucking portion 3 provided in one plate glass 1A of the pair of plate glasses 1 for vacuum closing a void portion V between the two plate glasses 1.

The glass panel P is formed by closing in a state in which air in the void portion V is sucked through the sucking portion 3.

The one plate glass 1A and the other plate glass 1B of the pair of plate glasses 1 are both constructed with a float plate glass (thickness dimension: 2.65 mm to 3.2 mm).

The spacers 2 are preferably made of a material having a compression strength of 5 t/cm$^2$ or more and, in this embodiment, they are made of stainless steel (SUS 304). If the strength is low, the atmospheric pressure acting on the plate glass 1 destroys the spacers 2, thereby making it impossible to form the void portion V and raising a fear that the heat insulating efficiency decreases.

The spacers 2 are formed to have a cylindrical shape. The shape dimensions are set such that the diameter is 0.3 mm to 1.0 mm and the height dimension is 0.15 mm or more. By forming the spacers 2 in a cylindrical shape, corner portions that are liable to generate stress concentration are less likely to be formed at their portions abutting against the two plate glasses 1, thereby preventing destruction of the plate glasses 1.

In the meantime, the spacers 2 are arranged at an interval of 20 mm in longitudinal and lateral directions along the plate plane.

The outer peripheral closing portion 4 is formed by disposing a low melting point glass (for example, solder glass) integrally between the outer peripheries of the two plate glasses 1A, 1B so as to close the void portion V.

The void portion V is constructed to exhibit, for example, an environment of reduced pressure ($1.0 \times 10^{-3}$ Torr or less) by a sucking and vacuumizing operation through the sucking portion 3.

Meanwhile, the outer peripheries of the two plate glasses 1 are formed in such a manner that the other plate glass 1B protrudes along the plate plane. By forming this protrusion 5, the outer peripheries of the void portion V can be closed effectively and firmly with the sealing member mounted on the protrusion 5 in forming the outer peripheral closing portion 4.

Next, the sucking portion 3 will be explained.

Figure 3:
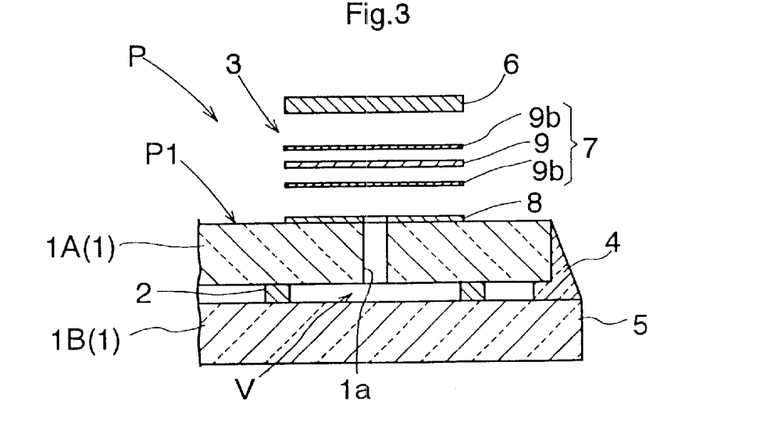
FIG. 3 to FIG. 5 are explanatory cross-sectional views showing a method of manufacturing a glass panel.

The sucking portion 3 is constructed with a sucking mouth 1a formed in the one plate glass 1A, a closing plate 6 provided to cover the sucking mouth 1a and to lie along a plane of the one plate glass 1A, and a bonding portion 7 for integrating the closing plate 6 with the plate glass 1A to cover the sucking mouth 1a, as shown in FIG. 3.

After sucking air of the void portion V through the sucking portion 3, the sucking portion 3 is sealed. In sealing, a surface of the edge portion of the sucking mouth 1a is metallized in a ring shape in advance (for example, a silver paste is printed and sintered). Then, with the solder plate 9 and the closing plate 6 made of metal being disposed in superposition on the silver-printed portion 8, heating (for example, partial heating or whole heating) is carried out to such a degree that the solder plate 9 is melted, as shown in FIG. 1. After the solder plate 9 is melted, the temperature is lowered to integrate the plate glass 1A with the closing plate 6 to close the sucking mouth 1a.

Figure 4:
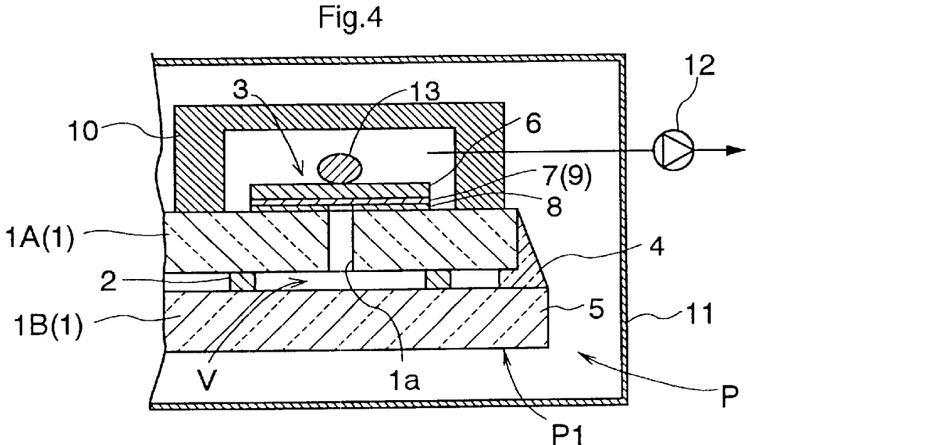
Figure 5:
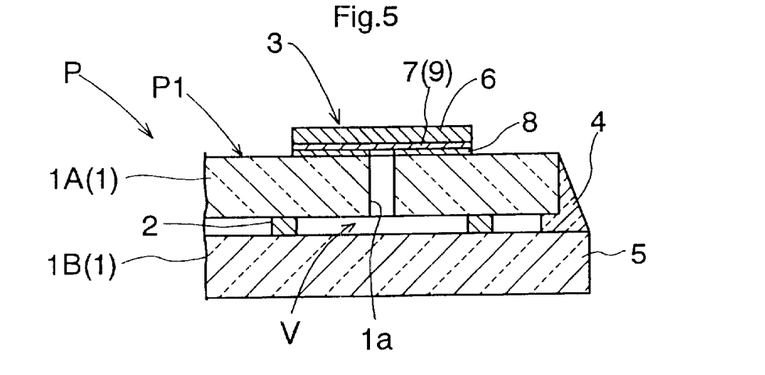

Also, the details of each portion will be explained. Referring to FIG. 3 to FIG. 5, the sucking mouth 1a is constructed with a through-hole formed in one plate glass 1A, and the closing plate 6 is constructed with a copper foil. The bonding portion 7 is constructed by melting/solidifying the solder plate 9.

Here, in integrating the one plate glass 1A with the closing plate 6 by means of the solder plate 9, it is preferable to perform after applying a cream solder 9b containing a flux component on upper and lower surfaces of the solder plate 9.

The solder plate 9 has a melting point of about 200 to 250° C., which is lower than the softening point (720 to 730° C.) of a plate glass or the melting point (1083° C.) of the closing plate 6 (copper foil). Therefore, in heating the solder plate 9, by setting the ambient temperature in sealing the sucking mouth to be about 250 to 300° C., the solder plate 9 can be melted without affecting the plate glass 1 or the closing plate 6, thereby to integrate the plate glass 1A and the closing plate 6.

Here, it is preferable that the solder plate 9 contains several percent of silver beforehand so that the metallized silver film will not be corroded easily.

One method relating to the sealing of the sucking portion 3 will be explained. Referring to FIG. 3 to FIG. 5:

[1-1] With respect to a glass panel body P1 having a solder plate 9 and a closing plate 6 mounted on the sucking portion 3, a suction case 10 is disposed to cover the sucking portion 3 and is put into a heating furnace 11.

[1-2] While maintaining the inside temperature of the furnace to be about 230° C., the void portion V is vacuumized by a sucking means 12 connected in communication with the suction case 10.

Here, in vacuumizing the void portion, it is preferable that a treatment such as mounting a weight 13 is carried out as shown in FIG. 4 so as to prevent the solder plate 9 and the closing plate 6 from being moved by air discharged from the sucking mouth 1a. Of course, the weight 13 need not be provided if there is no fear that the solder plate 9 or the like is moved, for example, if the suction of air in the void portion V is carried out moderately.

[1-3] As shown in FIG. 4, when the gas from the void portion V is sucked to a predetermined value, the inside temperature of the furnace is raised to 250° C. to melt the solder plate 9.

[1-4] The inside of the suction case 10 has the same degree of vacuum as the void portion V. While maintaining this state, the temperature is lowered for integration and sealing of the sucking portion 3. As shown in FIG. 5, the suction case 10 is removed after the temperature is lowered to an ambient temperature of use in the outside of the furnace.

The above steps complete the glass panel with reduced pressure in the void portion V and that can provide a high heat insulating effect.

Figure 6:
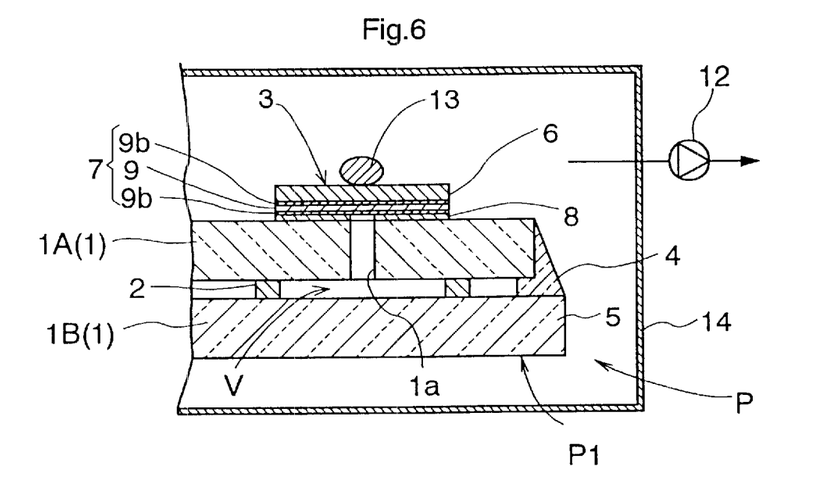
FIG. 6 to FIG. 8 are explanatory cross-sectional views showing a method of manufacturing a glass panel.
Figure 7:
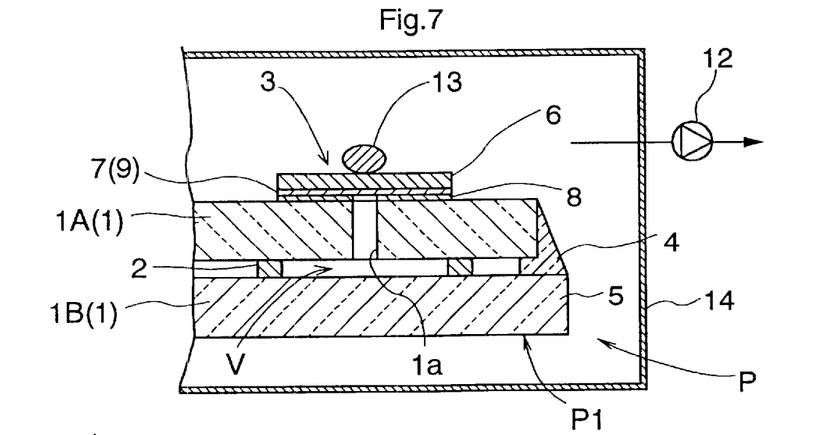
Figure 8:
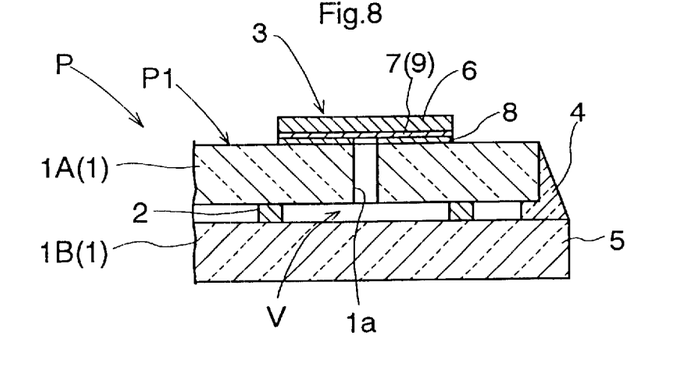

Further, another method relating to the sealing of the sucking portion 3 will be explained. Referring to FIG. 6 to FIG. 8:

[2-1] A glass panel body P1 having a solder plate 9 and a closing plate 6 mounted on the sucking portion 3 is put into a reduced-pressure heating furnace 14 whose inside temperature is maintained at about 230° C.

[2-2] As shown in FIG. 6, the void portion V is vacuumized in the reduced-pressure heating furnace 14.

[2-3] As shown in FIG. 7, the gas from the void portion V is sucked to a predetermined value for vacuumization, the inside temperature of the furnace is raised to 250° C. to melt the solder plate 9.

[2-4] While maintaining the state in which the solder plate 9 is melted and the plate glass 1A is integrated with the closing plate 6, the inside temperature of the furnace is lowered for integration and sealing of the sucking portion. Thereafter, the glass panel P is taken out of the furnace, as shown in FIG. 8.

The above steps can also complete the glass panel with reduced pressure in the void portion V to provide a high heat insulating effect.

Figure 9:
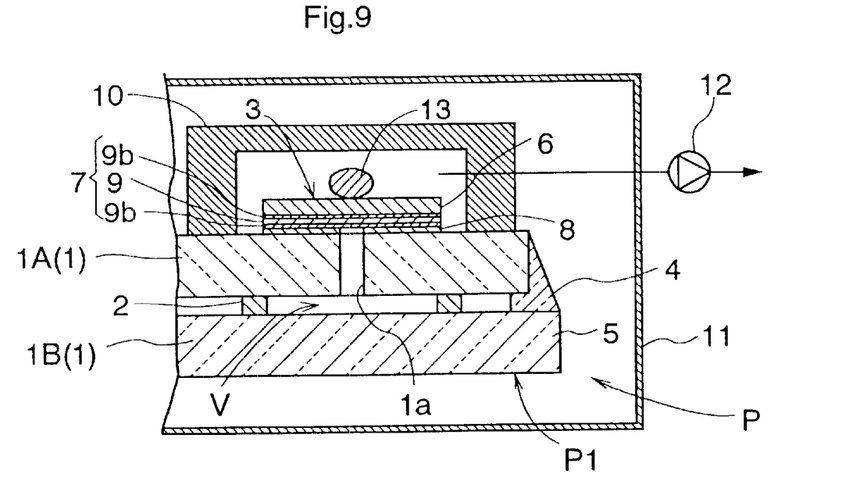
FIG. 9 to FIG. 11 are explanatory cross-sectional views showing a method of manufacturing a glass panel.
Figure 10:
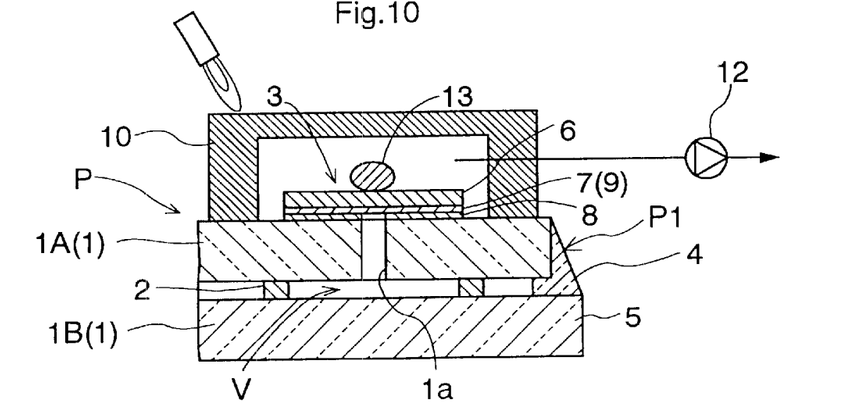
Figure 11:
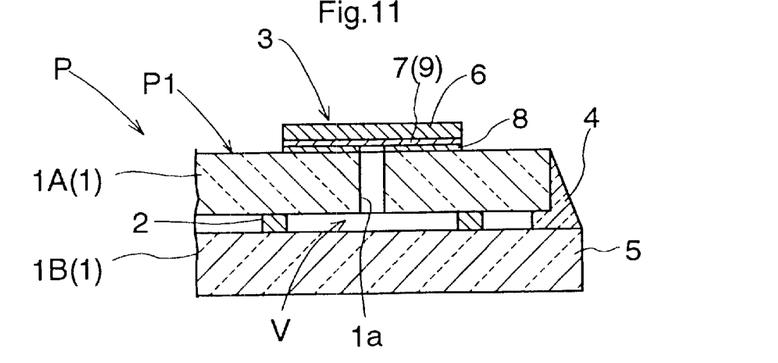

As still another method, as shown in FIG. 9 to FIG. 11, after carrying out steps similar to [1-1] and [1-2],

[3-3] The glass panel P is taken out of the furnace while maintaining the vacuumized state of the suction case 10 and the void portion V, and the solder plate 9 is melted by partial heating (See FIG. 10).

[3-4] While maintaining the state in which the solder plate 9 is melted and the plate glass 1A is integrated with the closing plate 6, the temperature is lowered for integration and sealing of the sucking portion. Thereafter, the suction case 10 is removed, as shown in FIG. 11.

The above steps can also complete the glass panel with reduced pressure in the void portion V and that can provide a high heat insulating effect.

OTHER EMBODIMENTS

Hereafter, other embodiments will be explained.

<1> The plate glass 1 is not limited to a plate glass having a thickness of 2.65 mm to 3.2 mm explained in the previous embodiment, but may be a plate glass having a different thickness.

The type of the glass may be arbitrarily selected, and it may be for example a figured glass, a ground glass (glass imparted with a function of diffusing light by surface treatment), a wire glass, a reinforced glass, a plate glass imparted with a function of heat ray absorption, ultraviolet ray absorption, heat ray reflection, or the like, or a combination therewith.

Further, the composition of the glass may be soda silicate glass (soda lime silica glass), borosilicate glass, aluminosilicate glass, or crystallized glass of various types.

<2> The plate glass 1 is not limited to the use of those in which the one glass 1A and the other glass 1B have different lengths or width dimensions, but those in which the two have the same dimension may be used as well. The two plate glasses 1A, 1B may be superposed with their edge portions aligned.

Further, the glass panel may be constructed by combining those in which the one plate glass 1A and the other plate glass 1B have different thickness dimensions.

<3> The spacers 2 are not limited to spacers made of stainless steel explained in the previous embodiments, but may be for example Inconel 718 or, besides this, other metal, quartz glass, ceramics, or others. In short, the spacers 2 can be those that hardly deform by an external force to bring the two glasses 1A, 1B in contact with each other.

<4> The method of metallization is not limited to sintering of the silver paste explained in the previous embodiment, but may be a metallization carried out by allowing a supersonic vibration to act on the solder (direct soldering method), plating, flame spraying, or the like.

The metal to be used may be copper or nickel besides silver.

<5> The bonding portion 7 is not limited to the solder plate 9 explained in the previous embodiment, but may be for example a low melting point glass (for example, solder glass). In this case, the metallization can be omitted, and a glass thin plate can be used as the closing plate 6.

<6> The solder plate 9 is not limited to a solder plate of flat plate shape explained in the previous embodiment, but may be for example those having a leg portion 9a formed between the solder plate and the metallized portion so that a gap S can be formed to enable communication between the void portion V and an external space V2, as shown in FIG. 12 to FIG. 14. In this case, communication resistance of a sucked gas is hardly generated in suction, making it possible to carry out smooth vacuumization.

<7> Also, in carrying out the partial heating of the bonding portion 7 in the embodiment <6>, the weight 13 may be mounted on the closing plate 6, as shown in FIG. 12. According to this construction, the melting of the leg portion 9a can be promoted in melting the bonding portion 7, thereby further improving the integration of the closing plate 6 with the one plate glass 1A.

Figure 15:
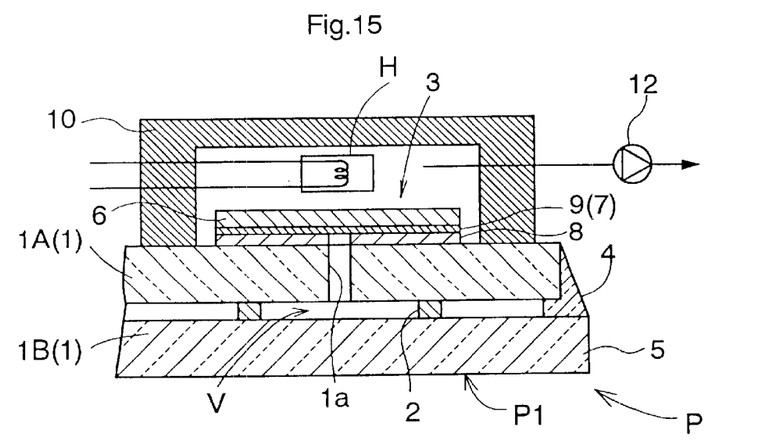
FIG. 15 is a cross-sectional view showing another embodiment of a heating source.

<8> Further, the partial heating of the bonding portion 7 can be carried out, for example, as shown in FIG. 15.

Namely, the whole inside of the suction case 10 or the solder plate 9 are partially heated by means of a heating source H disposed in the inside of the suction case 10.

As the heating source H, a halogen lamp or a halogen lamp with a reflection plate can be used, for example. By means of these, the temperature of only the sucking portion 3 can be further raised from 230° C. which is an internal atmosphere temperature of the heating furnace 11 or the reduced-pressure heating furnace 14; and also the sucking portion 3 can be heated after the internal atmosphere temperature of the heating furnace 11 is lowered, thereby to carry out the sealing work at an arbitrary timing.

<9> The structure of the sucking portion 3 is not limited to the one explained in the previous embodiment. For example, a ring-shaped metal plate 15 may be interposed between the plate glass 1 and the closing plate 6; and the bonding portion 7 may be constructed with a low melting point glass sintered layer 16 integrally interposed between a surface of the plate glass 1 on an edge of the sucking mouth 1a and the ring-shaped metal plate 15, and with a solder layer 17 integrally interposed between the ring-shaped metal plate 15 and the closing plate 6, as shown in FIG. 16 and FIG. 17.

A procedure of sealing the sucking mouth 3 in this case will be explained.

[1] First, a low melting point glass 16a is applied on a surface of the plate glass 1 on an edge of the sucking mouth 1a under an environment of atmospheric pressure. With the ring-shaped metal plate 15 mounted, the temperature is raised to 500° C. to sinter the low melting point glass 16a so as to integrate the plate glass 1 with the ring-shaped metal plate 15.

[2] Then, with the ring-shaped solder plate 9 and the closing plate 6 mounted on the ring-shaped metal plate 15, the environment of the sucking portion is made into a reduced-pressure environment, and the temperature is raised to about 300° C. to melt the solder plate 9 for sealing the sucking portion 3.

Here, the ring-shaped metal plate 15 may be made of a material such as an alloy of iron/nickel, an alloy of iron/nickel/chromium, or the like, and its expansion coefficient a is about 9.4 to $10.1 \times 1^{-6}/°C$.

Also as compared with the fact that the sintering temperature of the low melting point glass 16a is about 500° C. as previously mentioned, the temperature is raised only to about 300° C. in melting the solder plate 9. Therefore, gas is not generated from the low melting point glass sintered layer 16 when the solder is melted (at the time of sealing), so that it is easier to ensure the degree of vacuum in the closed reduced-pressure space between the two plate glasses 1. <10> Further, another embodiment of the sucking portion 3 will be explained.

Referring to FIG. 18 to FIG. 20, the closing plate 6 is constructed with a second solder plate 18. A ring-shaped metal plate 15 is interposed between the plate glass 1 and the closing plate 6. The bonding portion 7 is constructed with a low melting point glass sintered layer 16 integrally interposed between a surface of the plate glass 1 on an edge of the sucking mouth 1a and the ring-shaped metal plate 15.

A procedure of sealing the sucking mouth 1a in this case will be explained.

[1] First, as shown in FIG. 18, a low melting point glass 16a is applied on a surface of the plate glass 1 on an edge of the sucking mouth 1a under an environment of atmospheric pressure. With the ring-shaped metal plate 15 mounted, the temperature is raised to 500° C. to sinter the low melting point glass 16a so as to integrate the plate glass 1 with the ring-shaped metal plate 15.

[2] Next, as shown in FIG. 19, with a disk-shaped second solder plate 18 mounted on the ring-shaped metal plate 15, the environment of the sucking portion is made into a reduced pressure environment, and the temperature is raised to about 250 to 300° C. to melt the second solder plate 18 for sealing the sucking portion.

As a result of this, the second solder plate 18 and the ring-shaped metal plate 15 are firmly bonded, as shown in FIG. 20.

Here, the periphery of the second solder plate 18 is thinned by a wetting with the ring-shaped metal plate 15.

FIG. 19 illustrates, as the second solder plate 18, a plate-shaped solder mounted on the ring-shaped metal plate 15. However, besides this, a melted solder may be deposited on the ring-shaped metal plate 15 to form a plate-shaped solder.

<11> The above FIG. 16 to FIG. 20 show an example in which the closing plate 6 is bonded to the surface of the ring-shaped metal plate 15. However, the following technique may be adopted to ensure the bonding.

As an example, a cream solder containing a flux or fluxes may be applied beforehand on the surface of the ring-shaped metal plate 15 in the same manner as in the embodiment shown in the FIG. 3 to FIG. 5.

It can be expected that, if an oxide film is formed on the surface of the ring-shaped metal plate 15, application of a cream solder produces an effect of removing the oxide film. Also, even if an oxide film is not present on the surface, formation of an oxide film can be prevented in heating for bonding the closing plate 6 or the like. As a result of this, the ring-shaped metal plate 15 and the closing plate 6 can be firmly connected.

As another technique, instead of using the cream solder, a precious metal layer L may be provided on a surface of the ring-shaped metal plate 15 facing the closing plate 6.

In the case where the cream solder is used, a flux component or flux components contained in the cream solder is vaporized when the sucking mouth 1a is sealed by heating, though the reliability of the bonded portion between the ring-shaped metal plate 15 and the closing plate 6 can be increased. This vaporized component may possibly be a problem.

For example, if the amount of vaporization from the cream solder is large, the vaporized component(s) may possibly remain in the void portion V between the two plate glasses 1A, 1B to deteriorate the degree of vacuum, or the vaporized component(s) may possibly adhere onto the inside of the two plate glasses 1A, 1B to soil the inside of the glasses.

In order to avoid such inconveniences, a precious metal layer L may be provided on the surface of the ring-shaped metal plate 15 instead of using the cream solder.

The precious metal may be, for example, silver, gold, platinum, rhodium, palladium, an alloy containing these, or the like.

By providing the precious metal layer L, it is possible to prevent oxidation of the surface of the ring-shaped metal plate 15 in raising the temperature of the vicinity of the sucking mouth 1a to be high for fusing the ring-shaped metal plate 15 onto the one plate glass 1A.

As a result of this, the closing plate 6 can be firmly bonded to the surface of the ring-shaped metal plate 15, whereby the sealing of the sucking mouth 1a is made certain and the degree of vacuum in the void portion V can be maintained for a long period of time.

Figure 21:
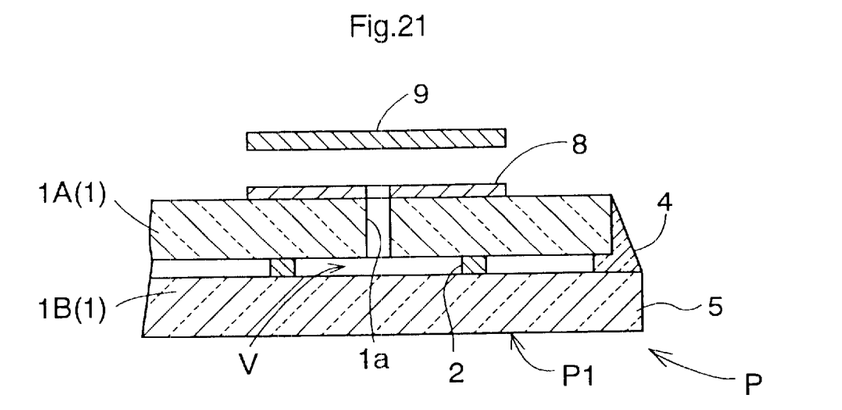
FIG. 21 and FIG. 22 are explanatory cross-sectional views showing another embodiment of a method of manufacturing a glass panel.
Figure 22:
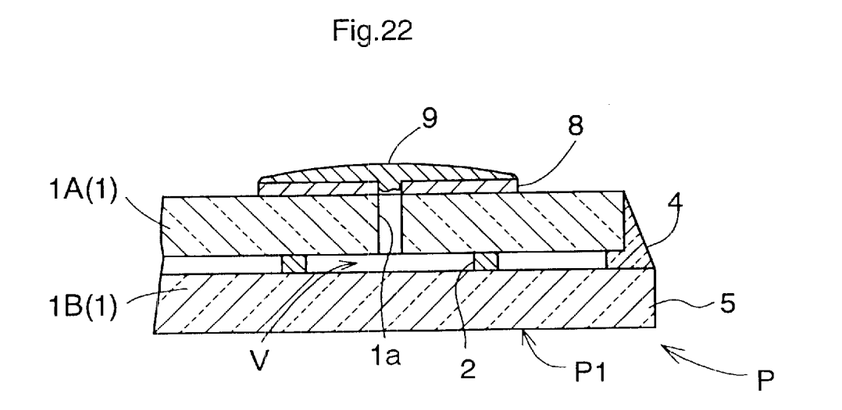

<12> Further, FIG. 21 and FIG. 22 show another embodiment of the sucking portion 3.

First, the surface of the edge portion of the sucking mouth 1a is metallized in the same manner as in the embodiment shown by FIG. 3. Specifically, for example, a silver paste is printed and sintered. Then, a solder plate 9 is mounted on the silver-printed portion 8 and heated to such a degree that the solder plate 9 is melted. At this time, if too much heating is carried out, the melted solder flows into the sucking mouth 1a, rendering it impossible to close the sucking mouth 1a. Therefore, it is of importance not to give too much heating.

If the sealing is carried out only by means of the metallization and the solder plate 9 as in this embodiment, the number of work steps are greatly reduced and the production of the glass panel can be carried out extremely efficiently.

<13> An example of the thickness dimensions of the materials to be used in the sucking portion in each of the above-mentioned embodiments is: the copper foil being 35 $\mu$m, the solder being 500 $\mu$m (dimension before melting), the ring-shaped metal plate 15 being 50 to 300 $\mu$m, and the metallized layer being 20 to 50 $\mu$m, whereby the protrusion from the glass surface can be made to have a dimension of 1 mm or less. On the other hand, if a conventional glass tube is used, the protrusion from the glass surface has a dimension of about 3 to 4 mm.

INDUSTRIAL APPLICABILITY

The glass panel of the present invention can be used for a variety of uses, for example, for use in architectures and vehicles (window pane for automobiles, window pane for railway cars, window pane for ships), for use in equipments (a front glass of a plasma display, an opening/closing door or wall part of a refrigerator, an opening/closing door or wall part of a temperature maintaining device), and others.

What is claimed is:

1. A glass panel comprising
    a plurality spacers interposed between a pair of plate glasses, an outer peripheral closing portion provided between outer peripheries of said pair of plate glasses and a sucking portion provided in one plate glass of said pair of plate glasses for vacuum-closing a void portion between said pair of plate glasses;
    wherein said sucking portion is constructed with a sucking mouth provided in said one plate glass, a closing plate disposed to cover the sucking mouth and to lie along a plane of said one plate glass, a ring-shaped metal plate interposed between said one plate glass and said closing plate, and a bonding portion for integrating said closing plate with said one plate glass to cover said sucking mouth; and
    said bonding portion is constructed with a low melting point glass sintered layer integrally interposed between a surface of said plate glass on an edge of said sucking mouth and said ring-shaped metal plate, and with a solder layer integrally interposed between said ring-shaped metal plate and said closing plate.

2. A glass panel comprising
    a plurality spacers interposed between a pair of plate glasses, an outer peripheral closing portion provided between outer peripheries of said pair of plate glasses and a sucking portion provided in one plate glass of said pair of plate glasses for vacuum-closing a void portion between said pair of plate glasses;
    wherein said sucking portion is constructed with a sucking mouth provided in said one plate glass, a second solder plate disposed to cover the sucking mouth and to lie along a plane of said one plate glass, a ring-shaped metal plate interposed between said one plate glass and said second solder plate, and a bonding portion for integrating said second solder plate with said one plate glass to cover said sucking mouth.

3. A glass panel according to claim 1, wherein a precious metal layer is provided on a surface of said ring-shaped metal plate that faces away from said one plate glass.

4. A glass panel according to claim 2, wherein a precious metal layer is provided on a surface of said ring-shaped metal plate that faces away from said one plate glass.

5. A method of manufacturing a glass panel comprising a plurality spacers interposed between a pair of plate glasses, an outer peripheral closing portion provided between outer peripheries of said pair of plate glasses and a sucking portion provided in one plate glass of said pair of plate glasses for vacuum-closing a void portion between said pair of plate glasses, said glass panel being formed by sealing said sucking portion after sucking gas in said void portion through said sucking portion;
    wherein a surface of said edge portion of a sucking mouth of said one plate panel is metalized in a ring shape in advance; and
    a solder plate is placed in superposition on said metalized portion and heated to melt said solder plate for closing said sucking mouth.

6. A method of manufacturing a glass panel comprising numerous spacers interposed between a pair of plate glasses, an outer peripheral closing portion provided between outer peripheries of said pair of plate glasses and a sucking portion provided in one plate glass of said pair of plate glasses for vacuum-closing a void portion between said pair of plate glasses, said glass panel being formed by sealing said sucking portion after sucking gas in said void portion through said sucking portion;
    wherein a ring-shaped metal plate is provided in advance to surround a surface of an edge portion of a sucking mouth of said one plate glass to be bonded to said one plate glass;
    a closing plate is provided on said ring-shaped metal place to lie along a plane of said one plate glass and a solder plate is interposed between said closing plate and said ring-shaped metal plate; and
    said solder plate and said closing plate are placed one on the other to cover said ring-shaped metal plate and then heated for integrating said one plate glass with said closing plate.

7. A method of manufacturing a glass panel comprising numerous spacers interposed between a pair of plate glasses, an outer peripheral closing portion provided between outer peripheries of said pair of plate glasses and a sucking portion provided in one plate glass of said pair of plate glasses for vacuum-closing a void portion between said pair of plate glasses, said glass panel being formed by sealing said sucking portion after sucking gas in said void portion through said sucking portion;
    wherein a surface of an edge portion of a sucking mouth of said one plate glass is metalized in a ring shape in advance;
    a solder plate is placed on said metalizing portion to cover said sucking mouth from above, said solder plate being capable of providing a gap for enabling communication between said void portion and an external space;
    a closing plate is then placed on said solder plate and heated to melt said solder plate for closing said sucking mouth with said solder plate.

8. A method of manufacturing a glass panel according to claim 5, wherein said solder plate includes a leg portion capable of supporting said solder plate in such a manner as to cover said sucking mouth from above.

9. A method of manufacturing a glass panel according to claim 6, wherein said solder plate includes a leg portion capable of supporting said solder plate in such a manner as to cover said sucking mouth from above.

10. A method of manufacturing a glass panel according to claim 7, wherein said solder plate includes a leg portion capable of supporting said solder plate in such a manner as to cover said sucking mouth from above.

* * * * *